(12) United States Patent
Varanese et al.

(10) Patent No.: US 9,363,017 B2
(45) Date of Patent: Jun. 7, 2016

(54) METHODS AND SYSTEMS OF SPECIFYING COAXIAL RESOURCE ALLOCATION ACROSS A MAC/PHY INTERFACE

(71) Applicant: QUALCOMM Incorporated, San Diego, CA (US)

(72) Inventors: Nicola Varanese, Nuremberg (DE);
Christian Pietsch, Nuremberg (DE);
Patrick Stupar, Nuremberg (DE);
Andrea Garavaglia, Nuremberg (DE);
Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 556 days.

(21) Appl. No.: 13/860,039

(22) Filed: Apr. 10, 2013

(65) Prior Publication Data

US 2014/0010539 A1     Jan. 9, 2014

Related U.S. Application Data

(60) Provisional application No. 61/668,999, filed on Jul. 6, 2012.

(51) Int. Cl.
| | |
|---|---|
| *H04B 10/27* | (2013.01) |
| *H04J 3/16* | (2006.01) |
| *H04L 12/413* | (2006.01) |
| *H04J 4/00* | (2006.01) |
| *H04L 5/00* | (2006.01) |

(52) U.S. Cl.
CPC .............. *H04B 10/27* (2013.01); *H04J 3/1694* (2013.01); *H04J 4/00* (2013.01); *H04L 12/413* (2013.01); *H04L 5/0007* (2013.01); *H04L 5/0046* (2013.01); *H04L 5/0053* (2013.01); *H04L 5/0058* (2013.01)

(58) Field of Classification Search
CPC ........................................................ H04B 10/27
USPC ................ 370/436, 432, 349, 206, 458, 252;
398/98, 60, 115, 48, 25
See application file for complete search history.

(56) References Cited

U.S. PATENT DOCUMENTS

| | | |
|---|---|---|
| 5,638,371 A | 6/1997 | Raychaudhuri et al. |
| 6,154,464 A | 11/2000 | Feuerstraeter et al. |

(Continued)

FOREIGN PATENT DOCUMENTS

EP     2509259 A1     10/2012

OTHER PUBLICATIONS

Chan, C.A., "Improving Performance of Optical Access Networks", National Information and Communication Technology Australia (NICTA), Jan. 2010, pp. 1-202.

(Continued)

*Primary Examiner* — Andrew Lai
*Assistant Examiner* — Andrew C Lee
(74) *Attorney, Agent, or Firm* — Paradice and Li LLP

(57) ABSTRACT

A communication device includes a resource allocation module to allocate coax resources for signals to be transmitted over a cable plant and a coax physical layer device to transmit the signals over the cable plant using the allocated coax resources. The communication device also includes a media access controller, coupled to the multi-point control protocol implementation and the coax physical layer device, to provide to the coax physical layer device a bitstream that includes data for the signals and also includes information specifying the allocated coax resources.

28 Claims, 15 Drawing Sheets

(56) References Cited

U.S. PATENT DOCUMENTS

| | | | |
|---|---|---|---|
| 6,490,727 B1* | 12/2002 | Nazarathy | H04J 14/0226 348/E7.071 |
| 6,742,187 B1* | 5/2004 | Vogel | H04J 3/1694 348/E7.07 |
| 6,944,881 B1* | 9/2005 | Vogel | H04L 12/2801 375/222 |
| 7,301,970 B2 | 11/2007 | Kim et al. | |
| 7,548,549 B2 | 6/2009 | Bergeron et al. | |
| 7,602,917 B2 | 10/2009 | Vialen et al. | |
| 8,023,885 B2 | 9/2011 | Proctor, Jr. et al. | |
| 8,081,625 B2 | 12/2011 | Powell et al. | |
| 8,094,653 B2 | 1/2012 | Hepler et al. | |
| 8,098,691 B2 | 1/2012 | Powell et al. | |
| 8,149,861 B2 | 4/2012 | Yu et al. | |
| 8,824,899 B2* | 9/2014 | Yamashita | H04J 3/1694 398/1 |
| 2003/0117998 A1* | 6/2003 | Sala | H04Q 11/0067 370/351 |
| 2003/0152389 A1* | 8/2003 | Sala | H04Q 11/0067 398/98 |
| 2005/0058542 A1* | 3/2005 | Kruegel | F02C 7/277 415/191 |
| 2005/0083950 A1* | 4/2005 | Choi | H04Q 11/0067 370/395.53 |
| 2005/0100036 A1* | 5/2005 | Davis | H04Q 11/0067 370/432 |
| 2005/0129400 A1* | 6/2005 | Kim | H04J 14/0227 398/67 |
| 2006/0282737 A1* | 12/2006 | Shi | H03M 13/2966 714/746 |
| 2007/0133986 A1* | 6/2007 | Lee | H04J 14/0282 398/58 |
| 2007/0147837 A1 | 6/2007 | Yoo et al. | |
| 2007/0268846 A1 | 11/2007 | Proctor, Jr. et al. | |
| 2008/0049788 A1 | 2/2008 | McClellan | |
| 2008/0050443 A1 | 2/2008 | Kowalski et al. | |
| 2008/0080381 A1* | 4/2008 | Maheshwari | H04W 72/1278 370/235 |
| 2008/0080443 A1 | 4/2008 | Martinot et al. | |
| 2008/0178229 A1* | 7/2008 | Kliger | H04L 12/2803 725/79 |
| 2008/0253773 A1* | 10/2008 | Zheng | H04L 12/46 398/115 |
| 2008/0279125 A1 | 11/2008 | Hottinen | |
| 2009/0061887 A1 | 3/2009 | Hart et al. | |
| 2009/0092154 A1 | 4/2009 | Malik et al. | |
| 2009/0327506 A1 | 12/2009 | Diab | |
| 2010/0111524 A1 | 5/2010 | Yu | |
| 2010/0257391 A1 | 10/2010 | Dring et al. | |
| 2010/0322105 A1 | 12/2010 | Diab | |
| 2011/0058813 A1 | 3/2011 | Boyd et al. | |
| 2011/0078755 A1* | 3/2011 | Dai | H04H 20/69 725/111 |
| 2011/0150482 A1* | 6/2011 | Furusawa | H04Q 11/0067 398/79 |
| 2011/0211827 A1* | 9/2011 | Soto | H04B 10/071 398/25 |
| 2011/0261719 A1 | 10/2011 | Welin | |
| 2012/0257891 A1* | 10/2012 | Boyd | H04L 47/6215 398/45 |
| 2012/0257892 A1* | 10/2012 | Boyd | H04Q 11/0067 398/58 |
| 2012/0257893 A1 | 10/2012 | Boyd et al. | |
| 2012/0275893 A1* | 11/2012 | Colwell | E02F 3/46 414/685 |
| 2012/0307637 A1 | 12/2012 | Diab | |
| 2013/0004155 A1* | 1/2013 | Liang | H04Q 11/0067 398/9 |
| 2013/0202293 A1* | 8/2013 | Boyd | H04Q 11/0067 398/38 |
| 2013/0202304 A1* | 8/2013 | Boyd | H04L 12/2801 398/98 |
| 2013/0272177 A1 | 10/2013 | Wei et al. | |
| 2013/0315595 A1 | 11/2013 | Barr | |
| 2013/0343753 A1 | 12/2013 | Pietsch et al. | |
| 2013/0343759 A1 | 12/2013 | Pietsch et al. | |
| 2014/0003308 A1 | 1/2014 | Varanese et al. | |

OTHER PUBLICATIONS

Salinger et al., "Feasibility of TDD in EPoC," IEEE 802 Plenary San Diego, CA Jul. 16-20, 2012, pp. 1-57.

Shellhammer et. al., "Technical Viability of EPOC Time Division Duplex (TDD) Mode," IEEE 802.3 Interim Session Minneapolis, MN May 15-16, 2012, pp. 1-19.

Huang J., et al., "Design and Implementation of the Broadband Network Acess System over MoCA", SPIE, PO Box 18 Bellingham WA 98227-0010 USA, 2009, XP040504751, the whole document.

International Search Report and Written Opinion—PCT/US2013/047957—ISA/EPO—Sep. 25, 2013.

Varanese N., et al., "EPoC Architecture Considerations", Internet Citation, May 15, 2012), pp. 1-13, XP002713589, Retrieved from the Internet: URL: http://grouper.ieee.org/groups/802/3/epoc/public/may12/varanese 01a 0512.pdf [retrieved on Sep. 24, 2013] the whole document.

* cited by examiner

1200

Allocate coax resources for signals to be transmitted over a cable plant. (1202)

Generate a bitstream that includes data for the signals and information specifying the allocated coax resources. (1204)

> The bitstream includes data frames to convey the data for the signals and control frames to convey the information specifying the allocated coax resources. (1206)

> The bitstream includes data frames to convey the data for the signals and idle character sequences between the data frames. Times between successive data frames in the bitstream specify the allocated coax resources. (1208)

> The bitstream is divided into time slices. Respective time slices correspond to respective coax resources and include respective data frames to convey the data for the signals. (1210)

Generate the signals based on the bitstream. (1212)

> Map the data frames to coax resources based on the information in the control frames. (1214)

> Map the data frames to coax resources based on the times between successive data frames in the bitstream. (1216)

> Map the respective data frames in the respective time slices to the respective coax resources. (1218)

Transmit the signals over the cable plant using the allocated coax resources. (1220)

FIG. 12

METHODS AND SYSTEMS OF SPECIFYING COAXIAL RESOURCE ALLOCATION ACROSS A MAC/PHY INTERFACE

RELATED APPLICATION

This application claims priority to U.S. Provisional Patent Application No. 61/668,999, titled "Methods and Systems of Specifying Coaxial Resource Allocation Across a MAC/PHY Interface," filed Jul. 6, 2012, which is hereby incorporated by reference in its entirety.

TECHNICAL FIELD

The present embodiments relate generally to communication systems, and specifically to resource allocation in coaxial communication systems.

BACKGROUND OF RELATED ART

The Ethernet Passive Optical Networks (EPON) protocol may be extended over coaxial (coax) links in a cable plant. The EPON protocol as implemented over coax links is called EPoC. Implementing an EPoC network or similar network over a coax cable plant presents significant challenges. For example, the information rate in a coax line terminal may vary depending on scheduling and coax resource allocation. Also, modulation and coding schemes may vary as a function of coax network units and/or allocated coax resources.

BRIEF DESCRIPTION OF THE DRAWINGS

The present embodiments are illustrated by way of example and are not intended to be limited by the figures of the accompanying drawings.

FIG. 12 is a flowchart showing a method of performing signal generation in accordance with some embodiments

Like reference numerals refer to corresponding parts throughout the drawings and specification.

DETAILED DESCRIPTION

Figure 1A:
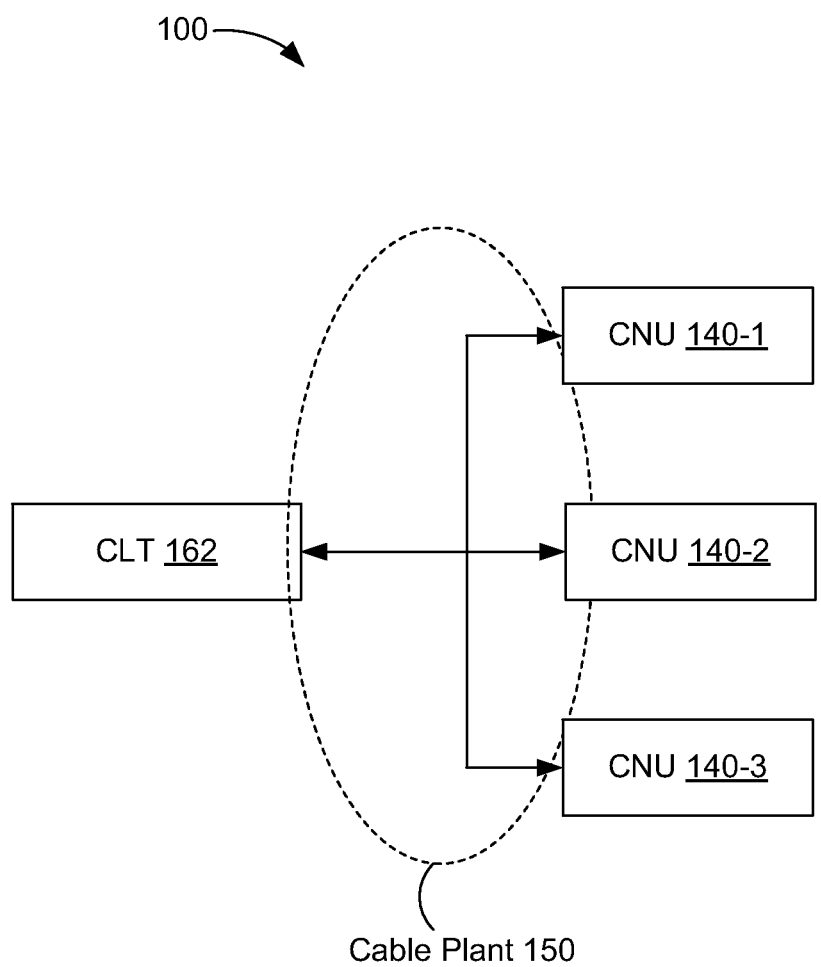
FIG. 1A is a block diagram of a coaxial network in accordance with some embodiments.

Embodiments are disclosed in which a bitstream is used to convey both data frames and information specifying coax resources to be used to transmit the data frames. The bitstream is provided from a media access controller (MAC) to a physical layer device (PHY).

In some embodiments, a communication device includes a resource allocation module to allocate coax resources for signals to be transmitted over a cable plant and a coax physical layer device (PHY) to transmit the signals over the cable plant using the allocated coax resources. The communication device also includes a media access controller (MAC), coupled to the resource allocation module and the coax PHY, to provide to the coax PHY a bitstream that includes data for the signals and also includes information specifying the allocated coax resources.

In some embodiments, a signal generation method as performed in a communication device includes allocating coax resources for signals to be transmitted over a cable plant, generating a bitstream that includes data for the signals and also includes information specifying the allocated coax resources, generating the signals based on the bitstream, and transmitting the signals over the cable plant using the allocated coax resources.

In some embodiments, a non-transitory computer-readable storage medium stores instructions for execution by one or more processors in a communication device. When executed by the one or more processors, the instructions cause the communication device to allocate coax resources for signals to be transmitted over a cable plant, generate a bitstream that includes data for the signals and also includes information specifying the allocated coax resources, and provide the bitstream to a coax PHY in the communication device. The coax PHY is to generate the signals based on the bitstream and transmit the signals over the cable plant using the allocated coax resources.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

FIG. 1A is a block diagram of a coax network 100 (e.g., an EPoC network) in accordance with some embodiments. The network 100 includes a coax line terminal (CLT) 162 (also referred to as a coax link terminal) coupled to a plurality of coax network units (CNUs) 140-1, 140-2, and 140-3 via coax links. A respective coax link may be a passive coax cable, or may also include one or more amplifiers and/or equalizers. The coax links compose a cable plant 150. In some embodiments, the CLT 162 is located at the headend of the cable plant 150 or within the cable plant 150 and the CNUs 140 are located at the premises of respective users.

The CLT 162 transmits downstream signals to the CNUs 140-1, 140-2, and 140-3 and receives upstream signals from the CNUs 140-1, 140-2, and 140-3. In some embodiments, each CNU 140 receives every packet transmitted by the CLT 162 and discards packets that are not addressed to it. The CNUs 140-1, 140-2, and 140-3 transmit upstream signals at scheduled times specified by the CLT 162. For example, the CLT 162 transmits control messages (e.g., GATE messages) to the CNUs 140-1, 140-2, and 140-3 specifying respective future slots (e.g., time slots) at which respective CNUs 140 may transmit upstream signals.

Figure 1B:
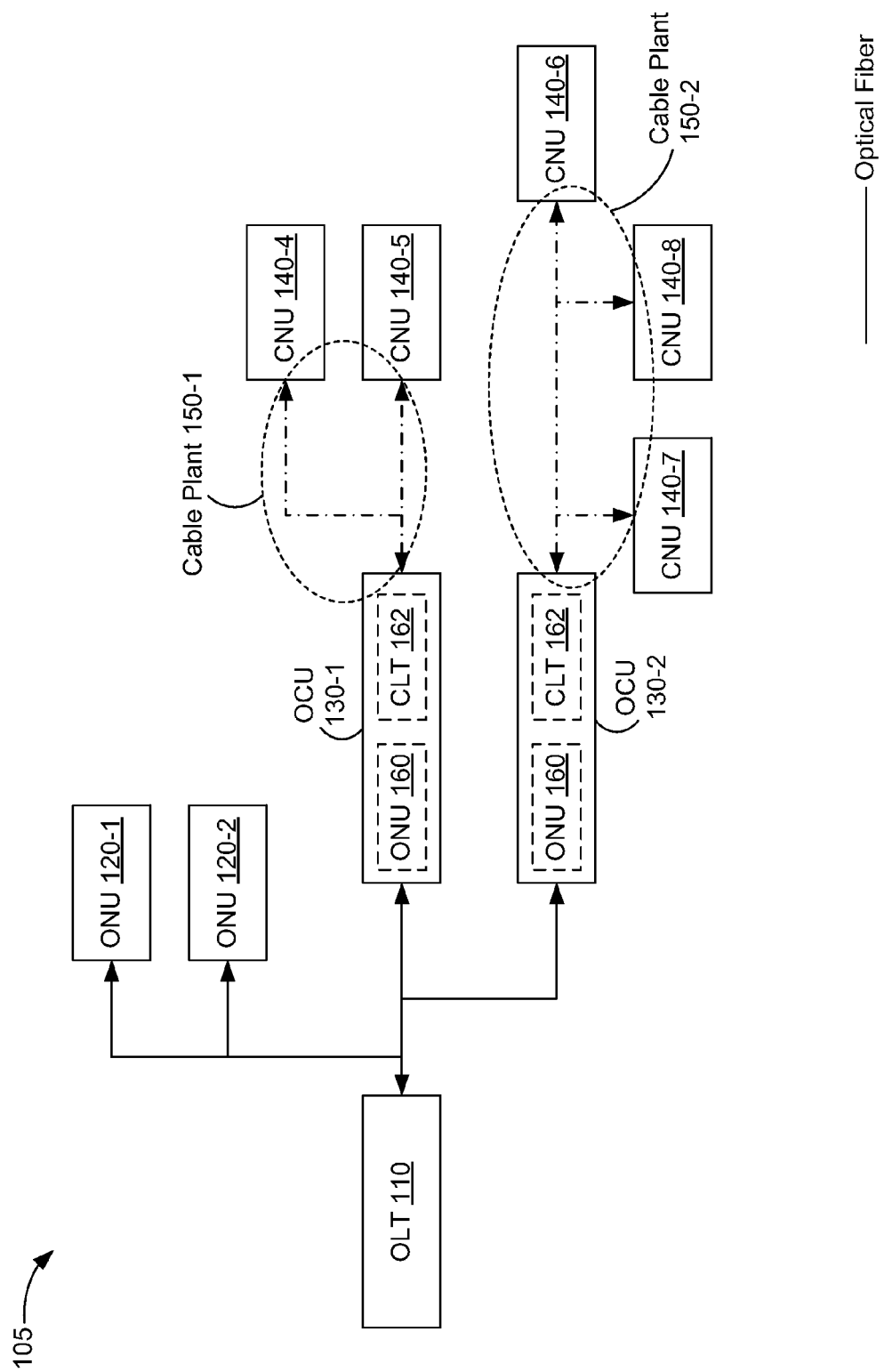
FIG. 1B is a block diagram of a network that includes both optical links and coax links in accordance with some embodiments.

In some embodiments, the CLT 162 is part of an optical-coax unit (OCU) 130 that is also coupled to an optical line terminal (OLT) 110, as shown in FIG. 1B. FIG. 1B is a block diagram of a network 105 that includes both optical links and coax links in accordance with some embodiments. The network 105 includes an optical line terminal (OLT) 110 (also referred to as an optical link terminal) coupled to a plurality of optical network units (ONUs) 120-1 and 120-2 via respective optical fiber links. The OLT 110 also is coupled to a plurality of optical-coax units (OCUs) 130-1 and 130-2 via respective optical fiber links. (OCUs are sometimes also referred to as fiber-coax units (FCUs), media converters, or coax media converters (CMCs)).

In some embodiments, each OCU 130-1 and 130-2 includes an ONU 160 coupled with a CLT 162. (Alternatively, an OCU 130 may not include a full ONU/CLT protocol stack.) The ONU 160 receives downstream packet transmissions from the OLT 110 and provides them to the CLT 162, which forwards the packets to the CNUs 140 on its cable plant 150. In some embodiments, the CLT 162 filters out packets that are not addressed to CNUs 140 on its cable plant 150 and forwards the remaining packets to the CNUs 140 on its cable plant 150. The CLT 162 also receives upstream packet transmissions from CNUs 140 on its cable plant 150 and provides these to the ONU 160, which transmits them to the OLT 110. The ONUs 160 thus receive optical signals from and transmit optical signals to the OLT 110, and the CLTs 162 receive electrical signals from and transmit electrical signals to CNUs 140.

In the example of FIG. 1B, the first OCU 130-1 communicates with CNUs 140-4 and 140-5, and the second OCU 130-2 communicates with CNUs 140-6, 140-7, and 140-8. The coax links coupling the first OCU 130-1 with CNUs 140-4 and 140-5 compose a first cable plant 150-1. The coax links coupling the second OCU 130-2 with CNUs 140-6 through 140-8 compose a second cable plant 150-2. A respective coax link may be a passive coax cable, or alternatively may include one or more amplifiers and/or equalizers. In some embodiments, the OLT 110, ONUs 120-1 and 120-2, and optical portions of the OCUs 130-1 and 130-2 are implemented in accordance with the Ethernet Passive Optical Network (EPON) protocol.

In some embodiments, the OLT 110 is located at a network operator's headend, the ONUs 120 and CNUs 140 are located at the premises of respective users, and the OCUs 130 are located at the headend of their respective cable plants 150 or within their respective cable plants 150.

In some embodiments, communications on a respective cable plant 150 are performed using time-division duplexing (TDD): the same frequency band is used for both upstream transmissions from the CNUs 140 to the CLT 162 and downstream transmissions from the CLT 162 to the CNUs 140, and the upstream and downstream transmissions are duplexed in time. For example, alternating time windows are allocated for upstream and downstream transmissions. A time window in which a packet is transmitted from a CNU 140 to a CLT 162 is called an upstream time window or upstream window, while a time window in which a packet is transmitted from a CLT 162 to a CNU 140 is called a downstream time window or downstream window.

Figure 2:
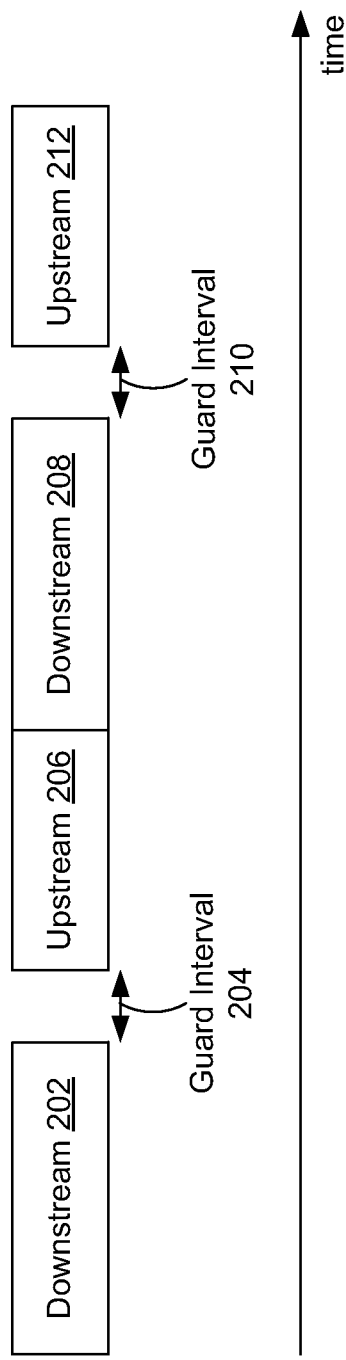
FIG. 2 illustrates timing of time-division duplexed upstream and downstream transmissions as measured at a coax line terminal in accordance with some embodiments.

FIG. 2 illustrates timing of upstream and downstream time windows, as measured at a CLT 162, used to implement TDD in accordance with some embodiments. As shown in FIG. 2, alternating windows are allocated for upstream and downstream transmissions. During a downstream time window 202, the CLT 162 transmits signals downstream to CNUs 140. The downstream time window 202 is followed by a guard interval 204, after which the CLT 162 receives upstream signals from one or more of the CNUs 140 during an upstream time window 206. The guard interval 204 accounts for propagation time on the coaxial links and for switching time in the CLT 162 to switch from a transmit configuration to a receive configuration. The guard interval 204 thus ensures separate upstream and downstream time windows at the CNUs 140. The upstream time window 206 is immediately followed by another downstream time window 208, another guard interval 210, and another upstream time window 212. Alternating downstream and upstream time windows continue in this manner, with successive downstream and upstream time windows being separated by guard intervals and the downstream time windows immediately following the upstream time windows, as shown in FIG. 2. The upstream and downstream transmissions during the time windows 202, 206, 208, and 212 use the same frequency band. The time allocated for upstream time windows (e.g., windows 206 and 212) may be different than the time allocated for downstream time windows (e.g., windows 202 and 208). FIG. 2 illustrates an example in which more time (and thus more bandwidth) is allocated to downstream time windows 202 and 208 than to upstream time windows 206 and 212.

Alternatively, communications on a respective cable plant 150 are performed using frequency-division duplexing (FDD): different frequency bands are used for upstream and downstream transmissions. In some embodiments, the CLT 162 and/or the CNUs 140 are configurable to perform TDD in a first mode and FDD in a second mode. For example, upstream and downstream communications may occur in the respective time windows of FIG. 2 in the first mode and may occur in separate frequency bands in the second mode.

Figure 3:
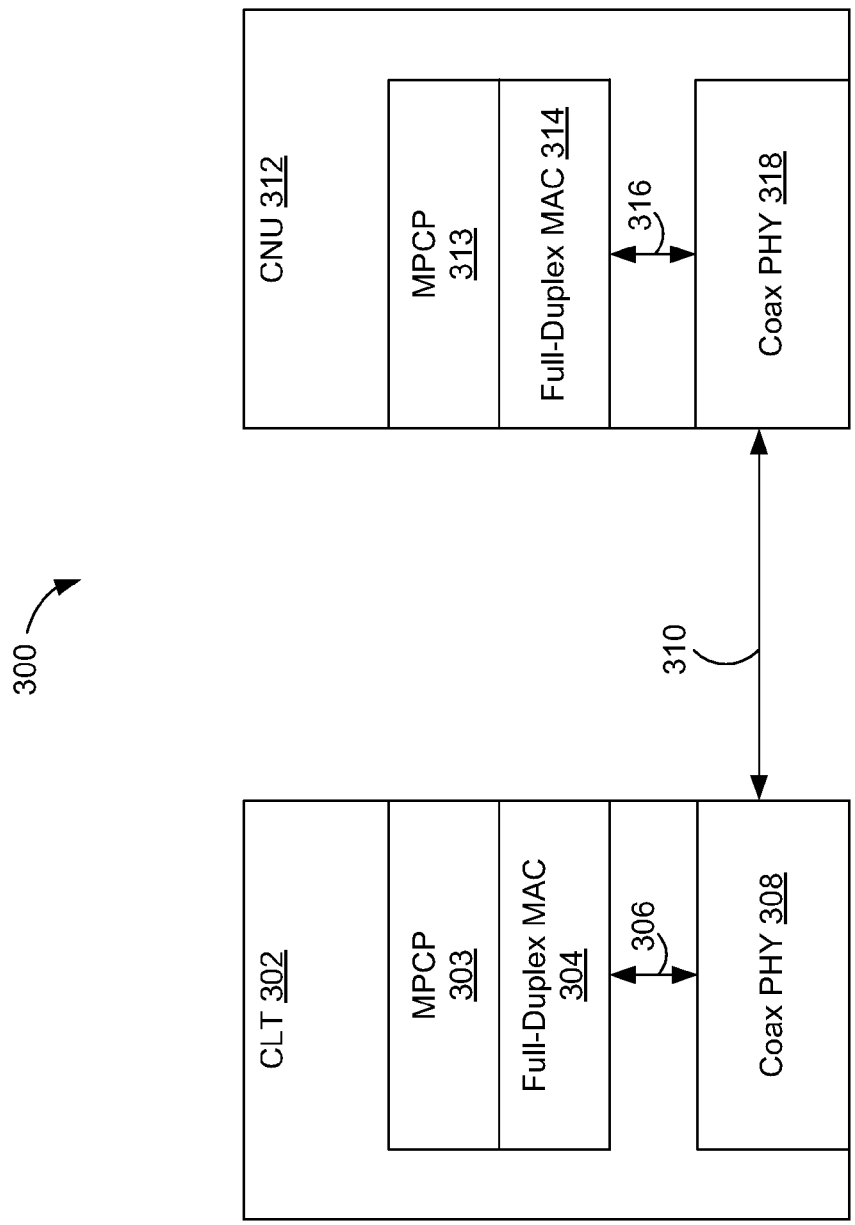
FIG. 3 is a block diagram of a system in which an optical-coax unit or coax line terminal is coupled to a coax network unit by a coax link in accordance with some embodiments.

FIG. 3 is a block diagram of a system 300 in which a CLT 302 is coupled to a CNU 312 by a coax link 310 in accordance with some embodiments. The CLT 302 is an example of a CLT 162 (FIGS. 1A-1B) and the CNU 312 is an example of one of the CNUs 140-1 through 140-8 (FIGS. 1A-1B). The CLT 302 and CNU 312 communicate via the coax link 310 using TDD or FDD. The coax link 310 couples a coax physical layer device (PHY) 308 in the CLT 302 to a coax PHY 318 in the CNU 312.

The coax PHY 308 in the CLT 302 is coupled to a full-duplex media access controller (MAC) 304 by a media-independent interface 306. The media-independent interface 306 conveys signals from the MAC 304 to the PHY 308 (e.g., at a fixed rate) and also conveys signals from the PHY 308 to the MAC 304 (e.g., at the fixed rate). In some embodiments, the data rate of the media-independent interface in each direction is higher than the data rate for the coax link 310, which may allow the PHY 308 to perform both TDD and FDD communications despite being coupled to the full-duplex MAC 304.

The full-duplex MAC 304 is coupled to a multi-point control protocol (MPCP) implementation 303 that performs packet scheduling, allocates coax resources for transmission and/or reception of packets, and specifies the modulation and coding schemes (MCSs) to be used in transmitting and/or receiving packets. The MPCP implementation may also be referred to as a multi-point MAC controller.

The coax PHY 318 in the CNU 312 is coupled to a full-duplex MAC 314 by a media-independent interface 316. The full-duplex MAC 314 is coupled to an MPCP implementation (or multi-point MAC controller) 313 that communicates with the MPCP 303 to schedule upstream transmissions (e.g., by sending REPORT messages to the MPCP 303 and receiving GRANT messages in response). The MPCP 313 also performs coax resource allocation and MCS specification (e.g., based on instructions received from the MPCP 303, for example in GATE messages).

In some embodiments, the MPCP implementations 303 and 313 are implemented as distinct sub-layers in the respective protocol stacks of the CLT 302 and CNU 312. In other embodiments, the MPCP implementations 303 and 313 are respectively implemented in the same layers or sub-layers as the MACs 304 and 314 and/or in upper layers not shown in the figures.

Figure 4A:
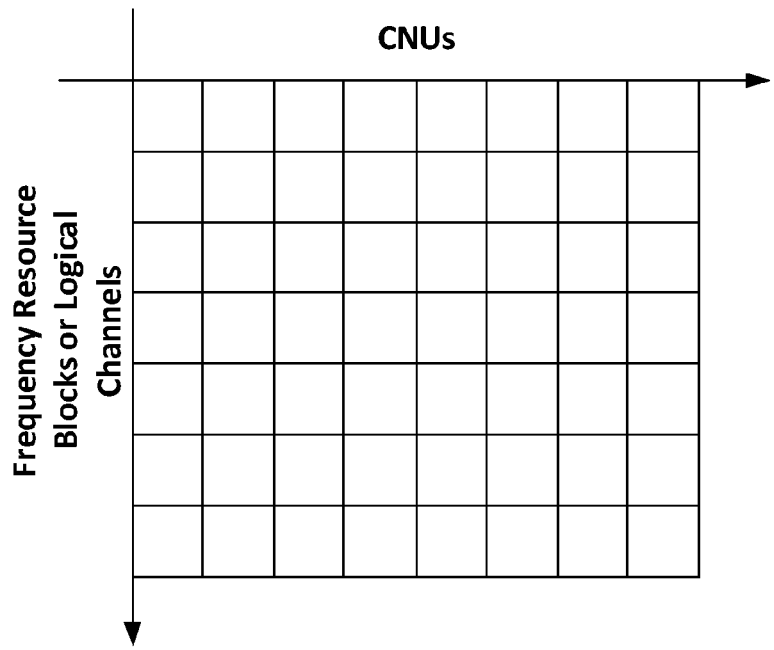
FIGS. 4A-4C illustrate examples of the adaptation of modulating and coding schemes used for signaling between a coax line terminal and coax network units.
Figure 4B:
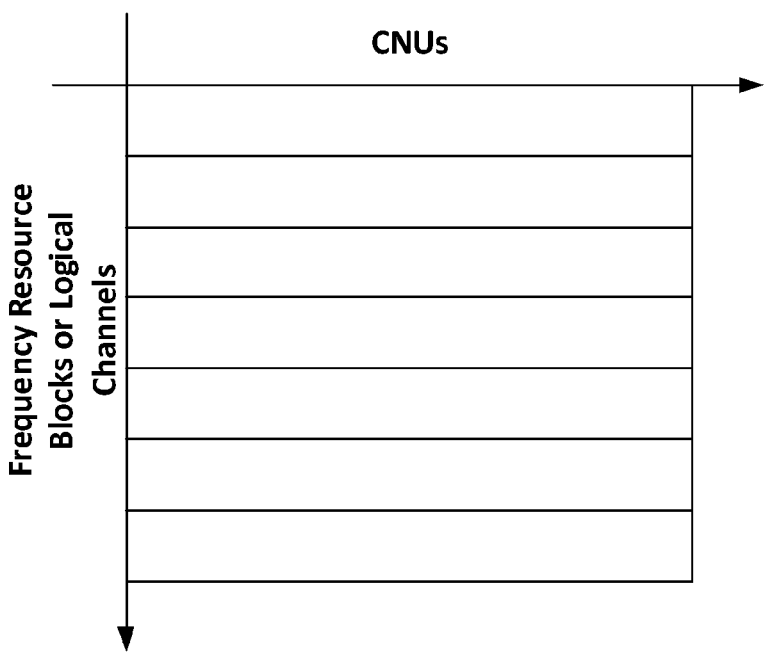
Figure 4C:
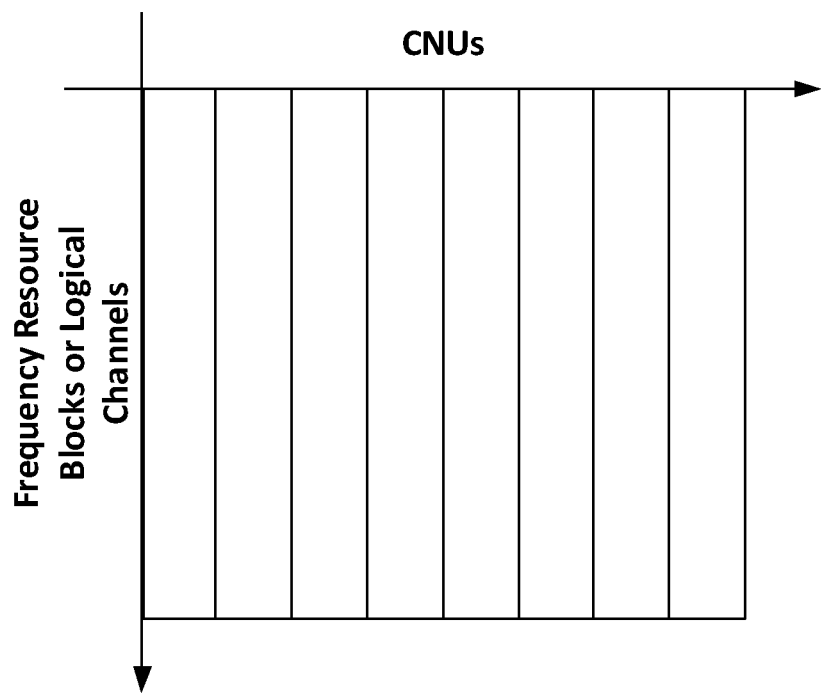

In some embodiments, the system 300 performs MCS adaptation: different modulation and coding schemes are used for different CNUs 140/312 and/or for different portions of the frequency spectrum or spectra used in the system 300. The modulation and coding schemes are assigned, for example, by the MPCP implementation 303 in the CLT 302. FIGS. 4A-4C illustrate three examples of MCS adaptation. The available frequency spectrum or spectra of the system 300 are divided into frequency resource blocks or into logical channels. A frequency resource block is a band of adjacent frequencies. For example, in an OFDM system, a frequency resource block is a block of contiguous sub-carriers. A logical channel is a grouping of frequencies including different sub-bands that may not be contiguous. For example, in an OFDM system a logical channel is a collection of one or more groups of sub-carriers that are not necessarily contiguous. Different resource blocks or logical channels may be allocated to different CNUs 312 for upstream and/or downstream communications between the CLT 302 and CNUs 312.

In FIGS. 4A-4C, the x-axis corresponds to different CNUs, the y-axis corresponds to different resource blocks or logical channels, and each square or rectangle may be assigned an MCS and thus corresponds to a potentially distinct MCS. (The spectral efficiency of an MCS may be measured in units of bits per second per Hertz (bps/Hz). A high-order MCS with a high spectral efficiency thus has a higher bit rate per portion of frequency spectrum than a low-order MCS with a low spectral efficiency.) In FIG. 4A, MCS adaptation is performed on a per-CNU and per-resource block (or per-logical channel) basis: each CNU may support a different MCS on each resource block or logical channel. In FIG. 4B, MCS adaptation is performed on a per-resource block (or per-logical channel) basis: each resource block or logical channel may support a different MCS, but the MCS used for a resource block or logical channel does not vary depending on the CNU to which the resource block or logical channel is allocated. In FIG. 4C, MCS adaptation is performed on a per-CNU basis: each CNU may support a different MCS, but the MCS used by a CNU does not vary depending on the resource block or logical channel allocated to the CNU.

In the example of FIG. 4B, in which MCS adaptation is performed on a per-resource block (or per-logical channel) basis, the overall information rate of the system 300 (FIG. 3) is constant, assuming that all resource blocks or logical channels are used on a continuous basis. In the examples of FIGS. 4A and 4C, however, the information rate of the system 300 may change over time, as different resource blocks or logical channels are allocated to different CNUs and the MCSs used for those resource blocks or logical channels are adapted accordingly.

Figure 5:
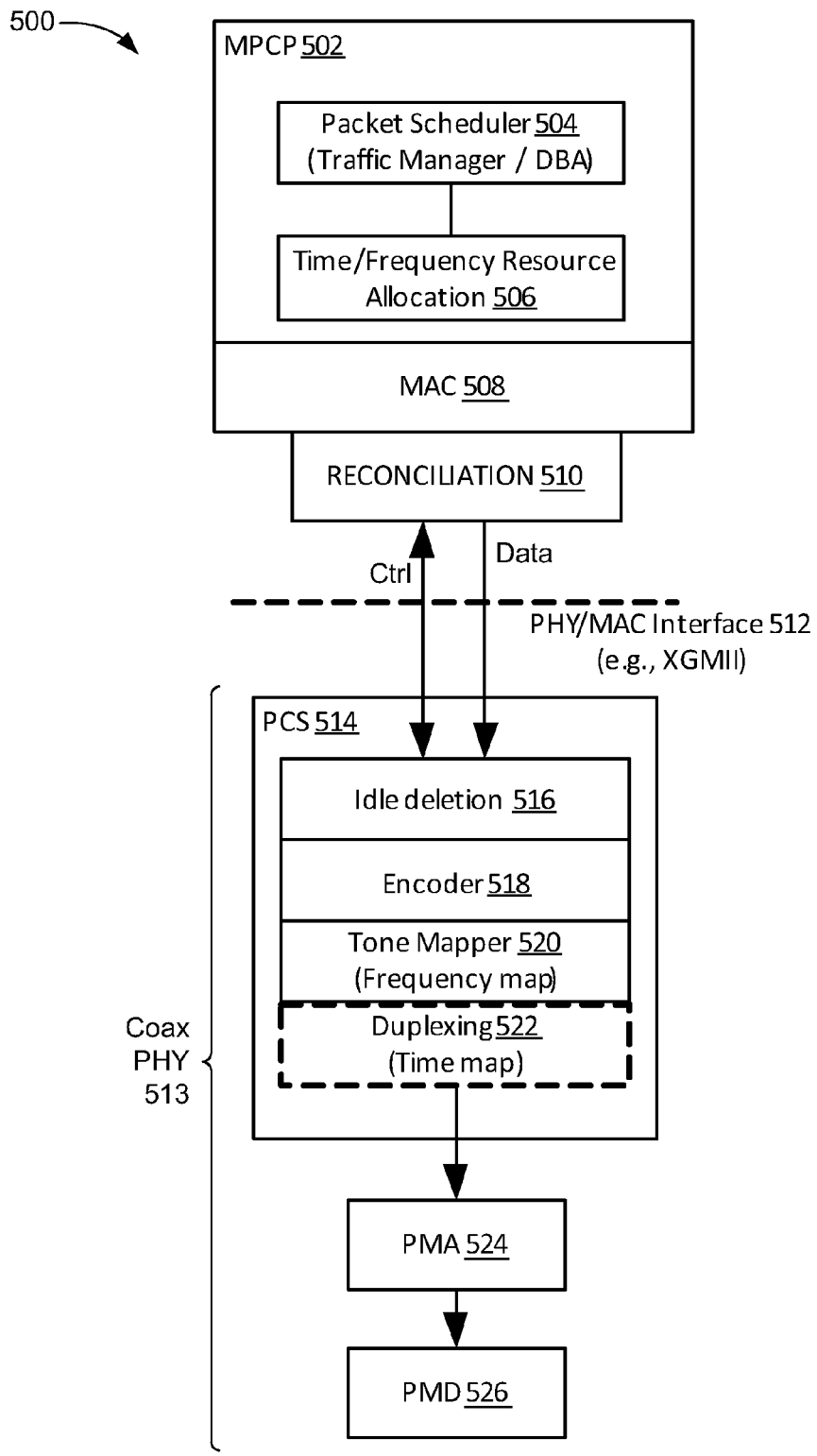
FIG. 5 illustrates a portion of a CLT protocol stack in accordance with some embodiments.

FIG. 5 illustrates a portion of a protocol stack 500 as implemented in the CLT 302 (FIG. 3) in accordance with some embodiments. The protocol stack 500 includes an MPCP implementation 502 coupled to a full-duplex MAC 508. The MAC 508 is coupled to a physical coding sub-layer (PCS) 514 through a reconciliation sub-layer (RS) 510 and a PHY/MAC interface 512 (e.g., an XGMII interface). The PCS 514 is coupled to a physical medium attachment sub-layer (PMA) 524 and through it to a physical medium dependent sub-layer (PMD) 526. The PCS 514, PMA 524, and PMD 526 compose a coax PHY 513. In some embodiments, the MPCP implementation 502 is an example of the MPCP implementation 303 in the CLT 302 (FIG. 3), the PHY/MAC interface 512 is an example of the media-independent interface 306 in the CLT 302 (FIG. 3), the MAC 508 is an example of the MAC 304 in the CLT 302 (FIG. 3), and the coax PHY 513 is an example of the coax PHY 308 in the CLT 302 (FIG. 3).

The MPCP 502 includes a packet scheduler 504 that performs traffic management and dynamic bandwidth allocation (DBA) in the upstream and/or downstream directions. In some embodiments, the packet scheduler 504 is coupled to a time and frequency resource allocation module 506 that allocates resource blocks or logical channels based on the scheduling performed by the scheduler 504. This allocation is communicated to the PCS 514 through the PHY/MAC interface 512. The allocation is communicated either explicitly or implicitly, as described below.

The interface 512 conveys bitstreams ("Data") in each direction (only the downstream transmission is indicated in FIG. 5) at a fixed rate $R_{MAC}$, which is greater than the information rate $R_{PCS}$. The information rate $R_{PCS}$ may be constant (e.g., in the case of FIG. 4B) or a variable rate $R_{PCS}(t)$ (e.g., in the case of FIG. 4A or 4C). Regardless, $R_{PCS}$ is less than $R_{MAC}$. Associated with the interface 512 are control signals (Ctrl) used to implement the interface 512. In some embodiments, these control signals do not signal information about time and frequency resource allocation; instead, the time and frequency resource allocation is provided from the MPCP 502 to the PCS 514 using the bitstream ("Data") transmitted from the MAC 508 to the PCS 514 at $R_{MAC}$.

The PCS 514 includes an idle deletion module 516 to delete idle characters from the bitstream received from the MAC 508, an encoder 518 to encode the data received in the bitstream (e.g., by adding parity bits and implementing specified MCSs), and a tone mapper 520 to perform frequency mapping. In some embodiments, the tone mapper 520 implements the resource allocation specified by the resource allocation module 506 in the MPCP implementation 502. In some embodiments, the PCS 514 also includes a duplexing adapter 522 to perform time mapping to implement TDD. For example, the duplexing adapter 522 performs rate adjustment to accommodate TDD and inserts pad bits or gaps at times during which the CLT 302 does not transmit (e.g., at times corresponding to upstream time windows 206 and 212 and guard intervals 204 and 210, FIG. 2).

Figure 6:
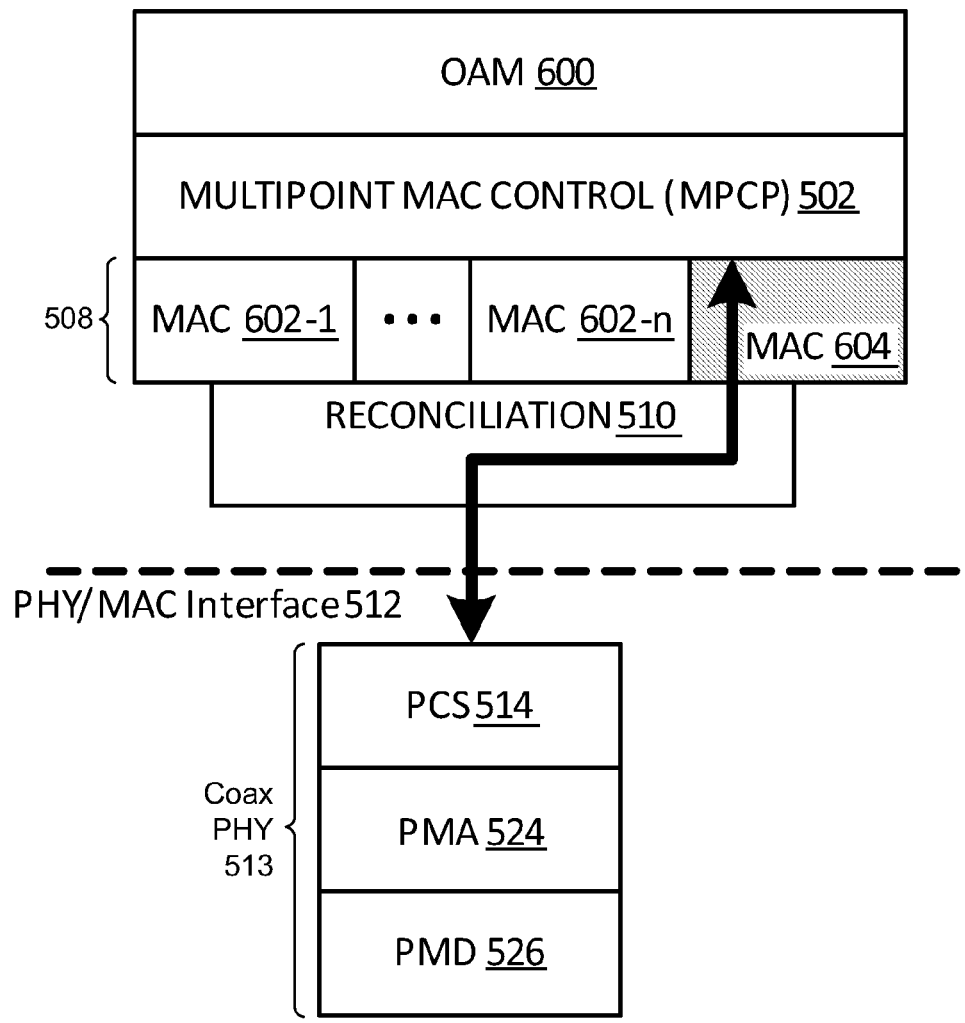
FIG. 6 illustrates a protocol stack capable of explicitly signaling resource allocation information from the multi-point control protocol implementation to the physical layer in accordance with some embodiments.

FIG. 6 illustrates an example of the protocol stack 500 in which resource allocation information from the MPCP 502 is explicitly signaled to the PCS 514. (In the example of FIG. 6, the protocol stack also includes an operations, administration, and management (OAM) sub-layer 600 coupled to the MPCP implementation 502.) The MAC 508 (e.g., full-duplex MAC 304, FIG. 3) includes a plurality of MAC entities 602-1 through 602-n, each of which corresponds to a respective CNU 312 coupled to the CLT 302 (FIG. 3). Each of the MAC entities 602-1 through 602-N processes packets addressed to its respective CNU 312 and provides these packets (in corresponding frames) to the PCS 514 through the interface 512. The MAC 508 also includes a MAC entity 604 that generates dummy control frames to convey resource allocation information to the PCS 514 (e.g., via the data portion of the interface 512).

Figure 7:
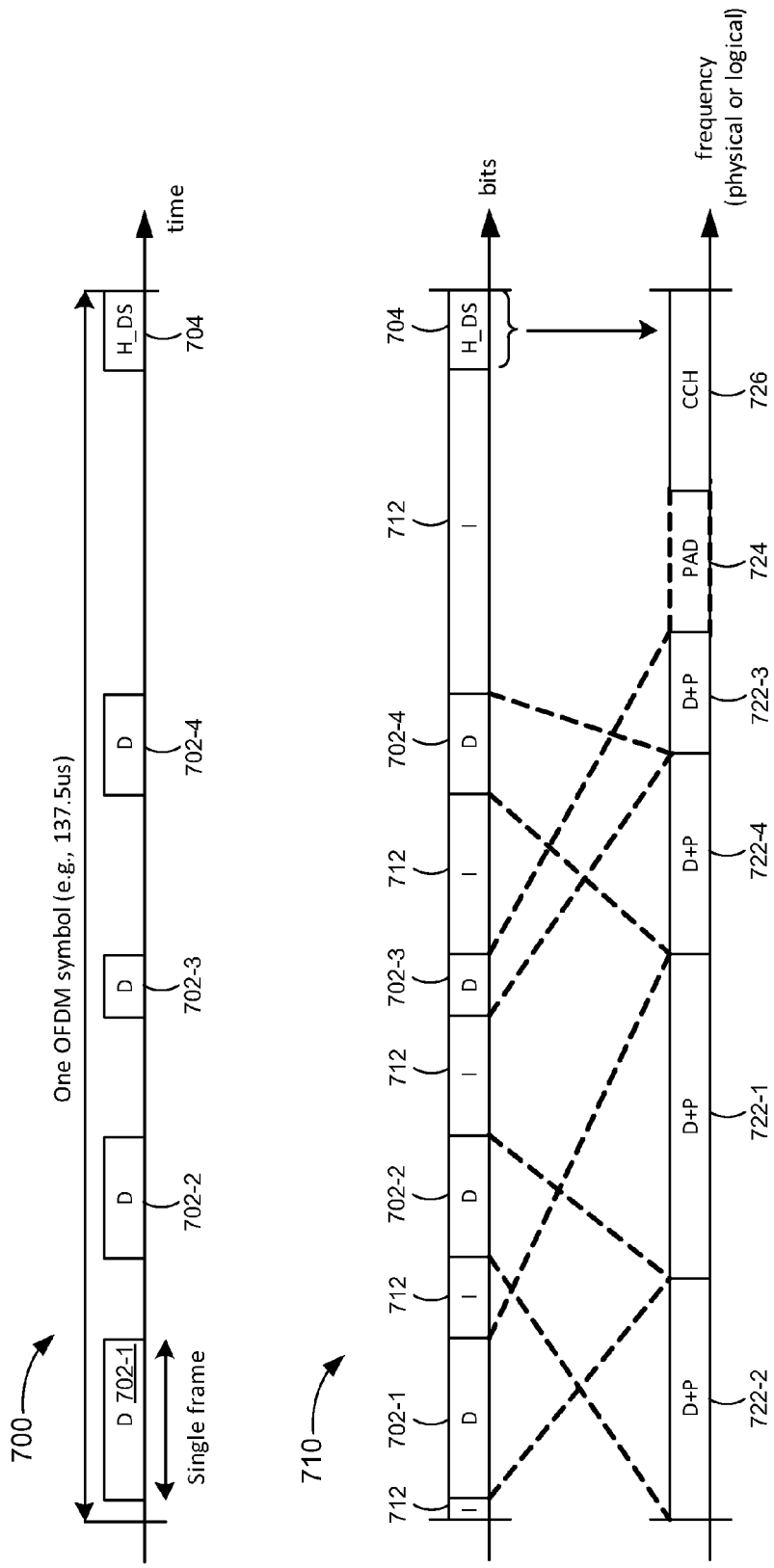
FIG. 7 illustrates bitstreams and signals generated during operation of the protocol stack of FIG. 6 in accordance with some embodiments.

FIG. 7 illustrates bitstreams and signals generated during operation of the protocol stack of FIG. 6 (e.g., as implemented in the CLT 302, FIG. 3). The MPCP implementation 502 generates a bitstream 700 with frames 702-1 through 702-4 that contain data (D) for four respective packets. The bitstream 700 also includes a dummy control frame 704 (H_DS) that includes resource allocation information for the frames 702-1 through 702-4 (e.g., as specified by the resource allocation module 506, FIG. 5). The portion of the bitstream 700 shown in FIG. 7, including frames 702-1 through 702-4 and dummy frame 704, has a duration of a single OFDM symbol. The spacing of the data frames 702-1 through 702-4 inherently matches the PCS information rate $R_{PCS}(t)$.

The MAC 508 converts the bitstream 700 into a bitstream 710 by inserting idle characters 712 between the frames 702-1 through 702-4 and 704. In some embodiments, the MAC 508 generates the bitstream 710 in conjunction with the RS 510. The MAC 508 and/or RS 510 insert the idle characters 712 to maintain the fixed rate $R_{MAC}$ of the bitstream 710 as transmitted across the PHY/MAC interface 512. The MAC 508 is agnostic as to whether a particular frame contains packet data (e.g., as for frames 702-1 through 702-4) or resource allocation information (e.g., as for frame 704).

The PCS 514 receives the bitstream 710, detects the frames 702-1 through 702-4 and 704 by virtue of the idle character sequences 712, and deletes the idle character sequences 712. The encoder 518 adds parity bits to the data (D+P) and encodes each frame 702-1 through 702-4 using specified MCSs (e.g., as specified by information in the dummy frame 704). In some embodiments, different frames 702-1 through 702-4 are encoded using different MCSs (e.g., in accordance with the MCS adaptation of FIG. 4A, 4B, or 4C). The encoded data are mapped to respective resource blocks or logical channels 722-1 through 722-4 (e.g., based on information in the dummy control frame 704). In some embodiments, information from the dummy control frame 704 is mapped to a control channel (CCH) 726 for transmission to downstream CLTs 302. (Alternatively, each resource block or logical channel may include a header specifying its MCS.) CLTs 302 will receive this information and use it to decode received data packets. In some embodiments, the control channel 726 uses a predefined, robust (e.g., low-order) MCS to ensure that the CLTs 302 can decode the information on the control channel 726. Any resource blocks or logical channels 724 that remain unused are filled with padding bits (e.g., zero bits). The result of this mapping is the signal 720.

The signal 720 is provided to the PMA 524, which processes it (e.g., using IFFT processing) and inserts PHY reference signals (e.g., pilots, preambles, etc.). The PMD 526 converts the signal to analog and transmits it (e.g., onto the coax link 310, FIG. 3).

In some embodiments, a CNU 312 (FIG. 3) includes a protocol stack with similar components and operation as the protocol stacks of FIGS. 5 and 6. For example, an MPCP implementation 502 (FIG. 5) in the CNU 312 schedules upstream transmissions to the CLT 302 (FIG. 3) using resources allocated by the CLT 302 in a control message (e.g., a GATE message). The control message may also specify the MCS to be used. A bitstream provided from the MAC 508 to the PCS 514 in the CNU 312 includes the data to be transmitted as well as a dummy control frame 704 specifying the allocated resources and specified MCS. The PCS 514 and other components of the PHY 318 (FIG. 3) prepare the upstream transmission based on this bitstream, in a similar manner as described with respect to FIGS. 5-7.

Figure 8:
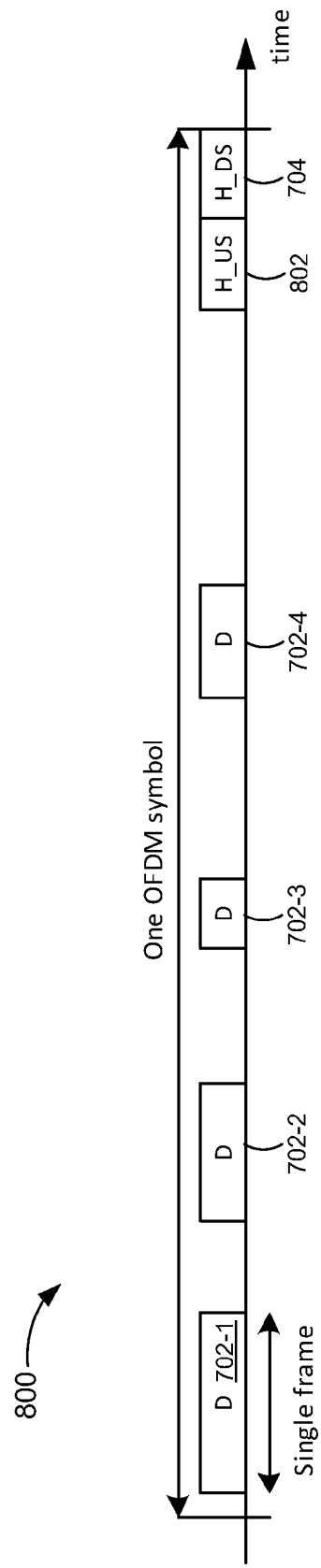
FIG. 8 illustrates a bitstream with dummy control frames as generated by a multi-point control protocol implementation in accordance with some embodiments.

In some embodiments, the MPCP 502 in the CLT 302 knows what resources and MCS have been assigned to the CNU 312 for its upstream transmission, because the MPCP 502 specified this information in the control message (e.g., GATE message) sent to the CNU 312 to authorize the transmission. The MPCP 502 provides this information to the PCS 514 in the CLT 302 using a dummy control frame 802 in a bitstream 800, as shown in FIG. 8 in accordance with some embodiments. The bitstream 800 is analogous to the bitstream 700 (FIG. 7) except that it includes the additional dummy control frame 802 (H_US). The PCS 514 receives the information in the dummy control frame 802 and uses it to decode the upstream transmission from the CNU 312. Alternatively, a physical-layer control channel (e.g., analogous to the downstream control channel CCH 726, FIG. 7) may be allocated for each CNU 312 on a cable plant 150 and used to notify the PCS 514 in the CLT 302 of the allocated resources and specified MCS for upstream transmissions.

FIGS. 6-8 thus illustrate examples of performing explicit signaling via the PHY/MAC interface 512 (FIG. 5) to communicate resource allocation and MCS information from the MPCP 502 to the PCS 514. In some embodiments, however, this information is signaled inherently. For example, this information may be signaled based on the position and/or duration of data frames in the bitstream provided from the MAC 508 to the PCS 514 (FIG. 5), instead of using dummy frames. The MAC entity 604 (FIG. 6) may be absent from the MAC 508 when inherent signaling of resource allocation and MCS information is used.

Figure 9:
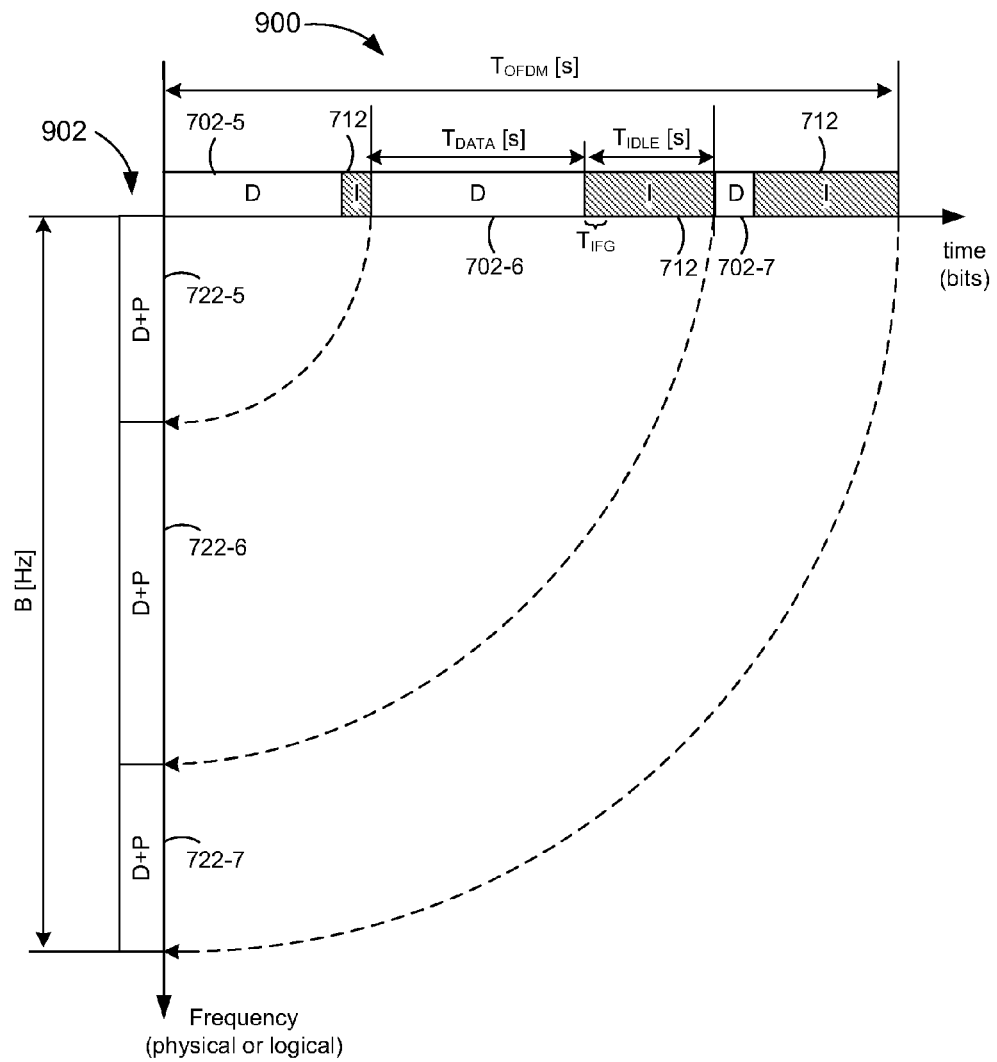
FIG. 9 is a block diagram illustrating inherent signaling of resource allocation and MCS specification based on frame duration and position in accordance with some embodiments.

FIG. 9 is a block diagram illustrating inherent signaling of resource allocation and MCS specification based on frame duration in accordance with some embodiments. (As FIG. 9 shows, the specific allocated resources depend on the order and thus the position of the frames as well as the duration.) The x-axis of FIG. 9 shows a portion of a bitstream 900 as provided to the PCS 514 across the PHY/MAC interface 512 (FIG. 5). In some embodiments, the bitstream 900 is generated by the MAC 508 in conjunction with the RS 510. The bitstream 900 is shown prior to forward error correction (FEC) coding (e.g., insertion of parity bits) and modulation by the PCS 514 (FIG. 5). The portion of the bitstream 900 shown in FIG. 9 has a duration equal to the duration $T_{OFDM}$ of an OFDM symbol. Frames 702-5 through 702-7, each containing data (D) for a respective packet, are separated by idle character sequences 712. Each idle character sequence 712 includes idle characters corresponding to an inter-frame gap of duration $T_{IFG}$ as well as additional idle characters added to maintain the constant rate $R_{MAC}$ of the PHY/MAC interface 512 (FIG. 5).

After FEC-coding, the PCS 514 (FIG. 5) maps the encoded data (D+P) for each frame 702-5, 702-6, and 702-7 to a respective resource block or logical channel 722-5, 722-6, and 722-7 in a symbol 902. The number of sub-carriers $n_{SC}$ in each resource block or logical channel 722-5, 722-6, and 722-7 is calculated based on the time duration from the beginning of the frame 702 being mapped to the beginning of the next frame:

$$n_{SC} = \frac{T_{Data} + T_{Idle}}{T_{OFDM}} \times N_{SC} \qquad (1)$$

where $T_{Data}$ is the duration of the frame 702, $T_{Idle}$ is the duration of the idle character sequence following the frame 702, and $N_{SC}$ is the total number of sub-carriers in an OFDM symbol. The MCS for each frame 702 is calculated as follows:

$$MCS = \frac{T_{Data} + T_{IFG}}{T_{Data} + T_{Idle}} \times MCS_{max} [\text{bps/Hz}] \qquad (2)$$

where $MCS_{max}$ is the maximum (e.g., highest order) MCS available for use in the system 300 (FIG. 3).

Figure 10:
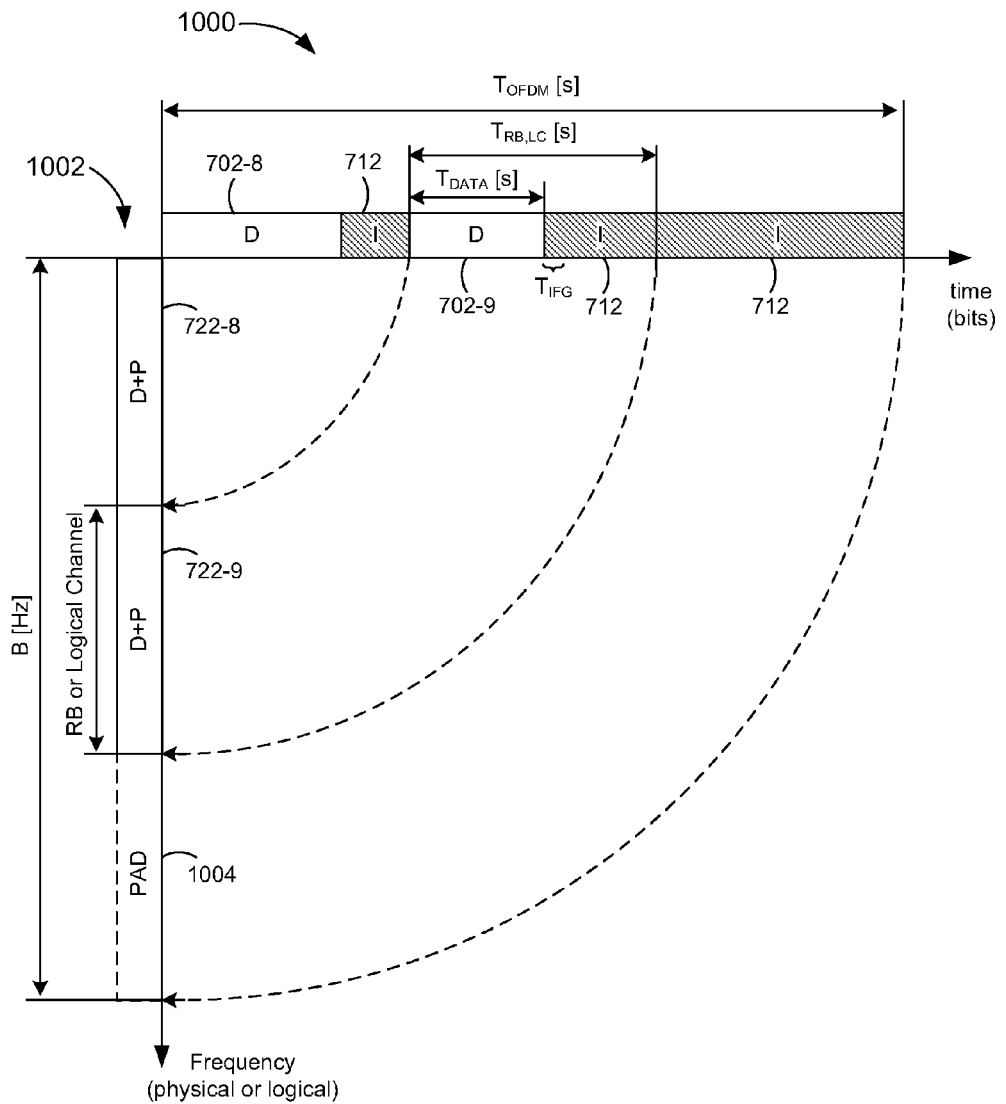
FIG. 10 is a block diagram illustrating inherent signaling of resource allocation and MCS specification in a bitstream divided into time slices in accordance with some embodiments.

In some embodiments, the system 300 (FIG. 3) is not fully loaded, such that not all resource blocks or logical channels are used in a given symbol. As a result, there may be lengthy sequences of idle characters 712 in a bitstream provided from the MAC 508 to the PCS 514 (FIG. 5), resulting in an inappropriately low value of MCS as calculated with equation (2). In such embodiments, the period $T_{OFDM}$ may be divided into a predefined number of time slices of period $T_{RB,LC}$, each corresponding to a respective resource block or logical channel, as shown for a bitstream 1000 in FIG. 10 in accordance with some embodiments. The bitstream 1000, like the bitstream 900 (FIG. 9), is provided from the MAC 508 to the PCS 514 across the PHY/MAC interface 512 (FIG. 5). Each time slice $T_{RB,LC}$ may include one or more frames 702 as well as idle characters 712, or may only include idle characters 712. While FIG. 10 shows a single frame 702-8 in a first time slice and a single frame 702-9 in a second time slice, a respective time slice may contain more than one frame.

The PCS 514 (FIG. 5) maps the frames 702-8 and 702-9 into respective resource blocks or logical channels 722-8 and 722-9. Unused resource blocks or logical channels 1004 corresponding to time slices without any frames 702 are filled with padding bits (e.g., zeros). The resource blocks or logical channels 722-8, 722-9, and 1004 compose a symbol 1002. In the example of FIG. 10, the number of sub-carriers $n_{SC}$ in each resource block or logical channel 722-8 and 722-9 is determined by the ratio of $T_{RB,LC}$ to $T_{OFDM}$:

$$n_{SC} = \frac{T_{RB,LC}}{T_{OFDM}} \times N_{SC}. \qquad (3)$$

The MCS for each frame 702 within each resource block or logical channel may be calculated as follows:

$$MCS = \frac{T_{Data} + T_{IFG}}{T_{RB,LC}} \times MSC_{max} [\text{bps/Hz}]. \qquad (4)$$

Equations (1)-(4) do not consider that bitstreams such as the bitstreams 900 and/or 1000 may also include idle characters for de-rating at the interface 512 to match $R_{MAC}$. Idle characters added to bitstreams such as the bitstreams 900 and/or 1000 for de-rating may not correspond to resource allocation or MCS determination, and may be included in the bitstreams 900 and/or 1000 in addition to idle characters relating to resource allocation and MCS determination.

Figure 11:
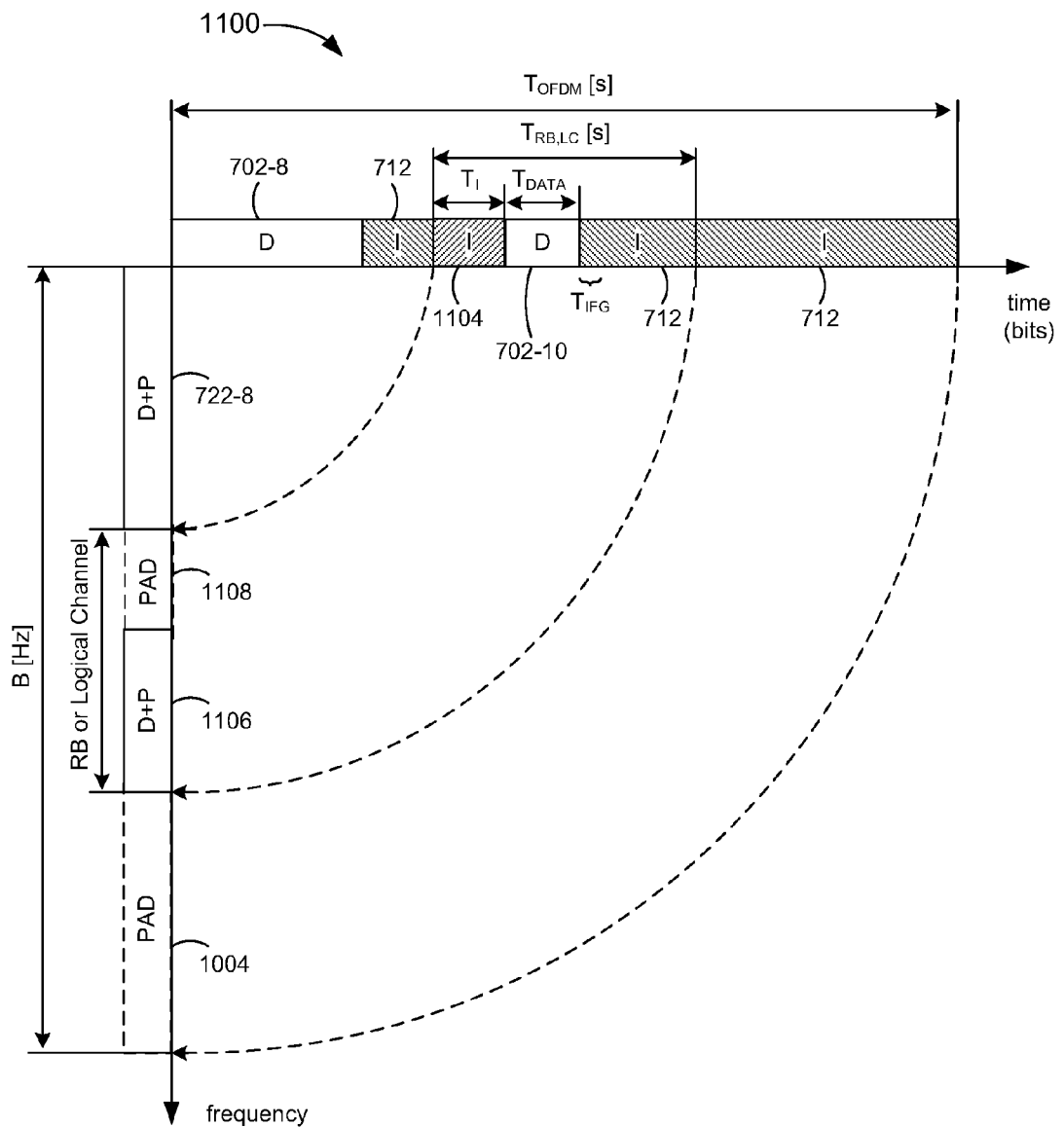
FIG. 11 is a block diagram illustrating inherent signaling of resource allocation and MCS specification in a bitstream divided into time slices in accordance with some embodiments.

In some embodiments, the MCS is calculated based on the position of a frame within a time slice of period $T_{RB,LC}$, as illustrated in FIG. 11 in accordance with some embodiments. FIG. 11 shows a bitstream 1100 provided from the MAC 508 to the PCS 514 across the PHY/MAC interface 512 (FIG. 5). A frame 702-10 within a time slice may start at a time $T_I$ after the beginning of the time slice: the first data bit of the frame 702-10 starts at the time $T_I$ after the beginning of the time slice, and idle characters 1104 precede the frame 702-10 within the time slice. The MCS may be computed based on the position of this first data bit:

$$MCS = \frac{T_I}{T_{RB,LC}} \times MSC_{max} [\text{bps/Hz}]. \qquad (5)$$

Alternatively, the MCS may be computed based on the position of the last data bit of the frame 702-10:

$$MCS = \frac{T_I + T_{Data} + T_{IFG}}{T_{RB,LC}} \times MCS_{max} [\text{bps/Hz}]. \qquad (6)$$

Equations (5) or (6) may be used to ensure that a small packet is not automatically encoded with a low-order MCS.

In the example of FIG. 11, the frame 702-10 as encoded occupies only a portion 1106 of a resource block or logical channel; the remainder 1108 of the resource block or logical channel is filled with padding bits (e.g., zeros).

FIG. 12 is a flowchart showing a method 1200 of performing signal generation in accordance with some embodiments. The method 1200 is performed by a communication device (e.g., a CLT 162, FIGS. 1A and 1B).

In the method 1200, coax resources are allocated (1202) for signals that are to be transmitted over a cable plant 150 (FIGS. 1A and 1B). This allocation is performed, for example, in an MPCP implementation 502 (FIGS. 5 and 6). In some embodiments, this allocation is performed by a time and frequency resource allocation module 506 (FIG. 5) based on scheduling performed by a scheduler 504 (FIG. 5).

A bitstream is generated (1204) that includes data for the signals and also includes information specifying the allocated coax resources. The bitstream is generated, for example, in the MPCP implementation 502 and MAC 508 (FIGS. 5 and 6); the MAC 508 provides the bitstream to the coax PHY 513 (FIGS. 5 and 6). The signals are generated (1212) based on the bitstream and transmitted (1220) over the cable plant 150 using the allocated coax resources. For example, the PHY 513 generates and transmits the signals.

In some embodiments, the bitstream (e.g., bitstream 710, FIG. 7) includes (1206) data frames (e.g., data frames 702-1 through 702-4, FIG. 7) to convey the data for the signals and control frames (e.g., control frame 704, FIG. 7) to convey the information specifying the allocated coax resources. Generating the signals includes (1214) mapping the data frames to coax resources based on the information in the control frames. For example, respective control frames and respective groups of the data frames correspond to respective OFDM symbols. The respective control frames specify the allocated coax resources for the respective groups of the data frames. Data in the respective groups of the data frames are mapped to coax resources based on the allocation specified by the respective control frames. In the example of FIG. 7, the data frames 702-1 through 702-4 and control frame 704 correspond to an OFDM symbol. Data in the data frames 702-1 through 702-4 are mapped to coax resources based on the allocation specified by the control frame 704.

The control frames may further specify MCSs for data in corresponding data frames (e.g., corresponding groups of data frames). Generating the signals may further include modulating and encoding the data in accordance with the specified MCSs.

In some embodiments, these control frames are downstream control frames (e.g., control frame 704, FIGS. 7 and 8) and the signals are transmitted downstream to a plurality of CNUs 140 on the cable plant 150. The bitstream may also include upstream control frames (e.g., control frame 802, FIG. 8) to specify coax resources allocated for upstream transmissions from the plurality of CNUs 140. The upstream transmissions are received (e.g., by the coax PHY 513, FIGS. 5 and 6) on the coax resources specified by the upstream control frames. The upstream control frames may also specify MCSs for the plurality of CNUs 140 to use for the upstream transmissions. The received upstream transmissions are demodulated and decoded in accordance with the MCSs specified by the upstream control frames.

In some embodiments, the bitstream includes (1208) data frames (e.g., frames 702-5, 702-6, and 702-7, FIG. 9) to convey the data for the signals and sequences of idle characters (e.g., idle characters 712, FIG. 9). Times between successive data frames in the bitstream specify the allocated coax resources. Generating the bitstream includes (1216) mapping the data frames to coax resources based on the times between successive data frames in the bitstream. For example, a respective data frame in the bitstream is followed by a respective idle character sequence. The mapping comprises determining an amount of coax resources for the respective data frame based on a ratio of a sum of durations of the respective data frame and the respective idle character sequence to a predefined symbol duration (e.g., in accordance with equation 1). Furthermore, an MCS for the respective data frame may be selected based on a ratio of a sum of durations of the respective data frame and a predefined inter-frame gap to a sum of durations of the respective data frame and the respective idle character sequence (e.g., in accordance with equation 2).

In some embodiments, the bitstream is divided (1210) into time slices (e.g., with a period $T_{RB,LC}$, FIGS. 10 and 11). Respective time slices correspond to respective coax resources and include respective data frames to convey the data for the signals. Generating the bitstream includes (1218) mapping the respective data frames in the respective time slices to the respective coax resources (e.g., as shown in FIGS. 10 and 11, and in accordance with equation 3). Generating the bitstream may further include selecting modulation and coding schemes for the respective data frames based on durations of the respective data frames (e.g., in accordance with equation 4) or based on positions of the respective data frames in the respective time slices (e.g., in accordance with equation 5 or 6).

While the method 1200 includes a number of operations that appear to occur in a specific order, it should be apparent that the method 1200 can include more or fewer operations, which can be executed serially or in parallel. Performance of two or more operations may overlap and two or more operations may be combined into a single operation. For example, the operations 1202, 1204, 1212, and 1220 may be performed together in an ongoing manner.

Figure 13:
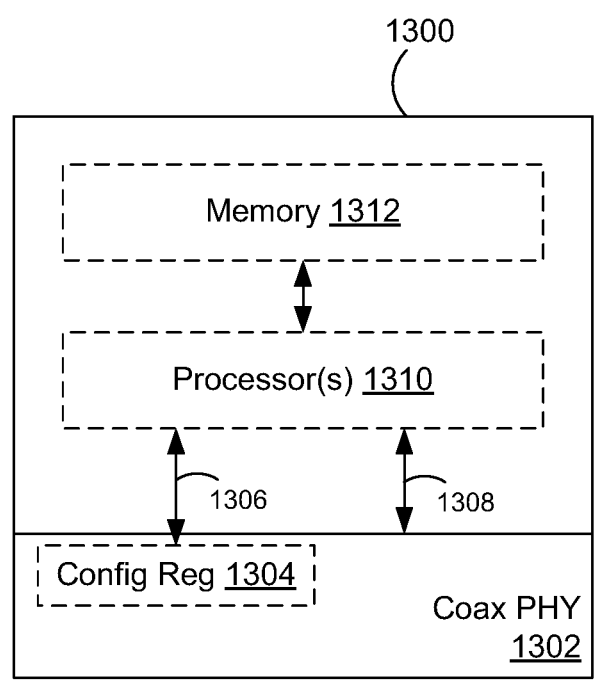
FIG. 13 is a block diagram of a communication device such as a CLT or CNU in accordance with some embodiments.

FIG. 13 is a block diagram of a communication device 1300 in accordance with some embodiments. The communication device 1300 may be an example of a CLT 162 (FIGS. 1A-1B), such as a CLT 302 (FIG. 3), or of a CNU 140 (FIGS. 1A-1B), such as a CNU 312 (FIG. 3). In the communication device 1300, a coax (e.g., EPoC) PHY 1302 (e.g., coax PHY 308 or 318, FIG. 3, such as PHY 513, FIGS. 5 and 6) is coupled to one or more processors or processor cores 1310 by a media-independent interface 1308 (e.g., interface 306 or 316, FIG. 3, such as interface 512, FIGS. 5 and 6) and a management data input/output (MDIO) bus 1306. The one or more processors 1310 are coupled in turn to memory 1312. In some embodiments, the memory 1312 includes a non-transitory computer-readable medium (e.g., one or more nonvolatile memory elements, such as EPROM, EEPROM, Flash memory, a hard disk drive, and so on) that stores instructions for execution by the one or more processors 1310. In some embodiments, when executed by the processor(s) 1310, the instructions cause the processor(s) 1310 to implement the functionality of the MAC 508 and/or MPCP implementation 502, as described with respect to one or more of FIGS. 5-11. In some embodiments, when executed by the processor(s) 1310, the instructions cause the communication device 1300 to perform all or a portion of the method 1200 (e.g., portions of the method 1200 performed by the MAC 508 and/or MPCP implementation 502). In some embodiments, the PHY 1302 may be configured to operate in one of a plurality of modes, wherein each mode implements an example of resource allocation and MCS specification as described herein. The PHY 1302 may be configured to operate in a particular mode, for example, by the processor(s) 1310 writing an appropriate value to a configuration register 1304 via the MDIO bus 1306.

While the memory 1312 is shown as being separate from the processor(s) 1310, all or a portion of the memory 1312 may be embedded in the processor(s) 1310. In some embodiments, the processor(s) 1310 and/or memory 1312 are implemented in the same integrated circuit as the coax PHY 1302. For example, the coax PHY 1302 may be integrated with the processor(s) 1310 in a single chip, which may or may not also include the memory 1312. Alternately, the coax PHY 1302 may be implemented in a separate chip from the processor(s) 1310 and memory 1312.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A communication device, comprising:
   a multi-point media access controller (MAC) controller to allocate coax resources for signals to be transmitted over a cable plant;
   a coax physical layer device (PHY) to transmit the signals over the cable plant using the allocated coax resources; and a MAC, coupled to the multi-point MAC controller and the coax PHY, to provide a bitstream comprising data for the signals and information specifying the allocated coax resources to the coax PHY, the bitstream further comprising data frames to convey the data for the signals and idle character sequences between the data frames, wherein times between successive data frames in the bitstream specify the allocated coax resources;

wherein:

a respective data frame in the bitstream is followed by a respective idle character sequence; and the coax PHY is to map the respective data frame to an amount of coax resources determined by a ratio of a sum of durations of the respective data frame and the respective idle character sequence to a predefined symbol duration.

2. The communication device of claim 1, further comprising an interface, coupled to the MAC and the coax PHY, to convey the bitstream to the coax PHY at a fixed rate.

3. The communication device of claim 1, wherein the bitstream comprises:

data frames to convey the data for the signals; and control frames to convey the information specifying the allocated coax resources.

4. The communication device of claim 3, wherein the control frames further specify modulation and coding schemes that the coax PHY is to use to generate the signals.

5. The communication device of claim 3, wherein:

respective groups of the data frames correspond to respective orthogonal frequency-division multiplexing (OFDM) symbols; and respective control frames correspond to respective OFDM symbols and specify the allocated coax resources for the respective groups of the data frames.

6. The communication device of claim 3, wherein:

the coax PHY is to transmit the signals downstream to a plurality of coax network units on the cable plant;

the control frames are downstream control frames; and the bitstream further comprises upstream control frames to specify coax resources allocated for upstream transmissions from the plurality of coax network units.

7. The communication device of claim 6, wherein the upstream control frames further specify modulation and coding schemes for the plurality of coax network units to use for the upstream transmissions.

8. The communication device of claim 1, wherein:

a respective data frame in the bitstream is followed by a respective idle character sequence with a duration greater than or equal to a predefined inter-frame gap; and the coax PHY is to select a modulation and coding scheme for the respective data frame based on a ratio of a sum of durations of the respective data frame and the predefined inter-frame gap to a sum of durations of the respective data frame and the respective idle character sequence.

9. The communication device of claim 1, wherein:

the bitstream is divided into time slices;

respective time slices comprise respective data frames to convey the data for the signals;

respective time slices correspond to respective coax resources; and the coax PHY is to map the respective data frames in the respective time slices to the respective coax resources.

10. The communication device of claim 9, wherein the coax PHY is to select modulation and coding schemes for the respective data frames based on positions of the respective data frames in the respective time slices.

11. The communication device of claim 1, wherein the coax resources comprise blocks of contiguous subcarriers for OFDM symbols.

12. The communication device of claim 1, wherein the coax resources comprise logical channels.

13. A signal generation method in a communication device, comprising:

allocating coax resources for signals to be transmitted over a cable plant;

generating a bitstream comprising data for the signals and information specifying the allocated coax resources, the bitstream further comprising data frames to convey the data for the signals and idle character sequences between the data frames, wherein times between successive data frames in the bitstream specify the allocated coax resources;

generating the signals based on the bitstream by mapping the data frames to coax resources based on the times between successive data frames in the bitstream; and transmitting the signals over the cable plant using the allocated coax resources;

wherein:

a respective data frame in the bitstream is followed by a respective idle character sequence; and an amount of coax resources for the respective data frame is determined based on a ratio of a sum of durations of the respective data frame and the respective idle character sequence to a predefined symbol duration.

14. The signal generation method of claim 13, wherein the bitstream comprises:

data frames to convey the data for the signals; and control frames to convey the information specifying the allocated coax resources.

15. The signal generation method of claim 14, wherein:

the control frames further specify modulation and coding schemes; and generating the signals comprises modulating and encoding the data for the signals in accordance with the specified modulation and coding schemes.

16. The signal generation method of claim 14, wherein:

respective groups of the data frames correspond to respective OFDM symbols; and respective control frames correspond to respective OFDM symbols and specify the allocated coax resources for the respective groups of the data frames.

17. The signal generation method of claim 14, wherein:

transmitting the signals comprises sending the signals downstream to a plurality of coax network units on the cable plant;

the control frames are downstream control frames; and the bitstream further comprises upstream control frames to specify coax resources allocated for upstream transmissions from the plurality of coax network units.

18. The signal generation method of claim 17, wherein the upstream control frames further specify modulation and coding schemes for the plurality of coax network units to use for the upstream transmissions, the method further comprising:

receiving the upstream transmissions on the coax resources specified by the upstream control frames; and demodulating and decoding the upstream transmissions in accordance with the modulation and coding schemes specified by the upstream control frames.

19. The signal generation method of claim 13, wherein:

a respective data frame in the bitstream is followed by a respective idle character sequence with a duration greater than or equal to a predefined inter-frame gap; and generating the signals comprises selecting a modulation and coding scheme for the respective data frame based on a ratio of a sum of durations of the respective data frame and the predefined inter-frame gap to a sum of durations of the respective data frame and the respective idle character sequence.

20. The signal generation method of claim 13, wherein:
the bitstream is divided into time slices;
respective time slices comprise respective data frames to convey the data for the signals;
respective time slices correspond to respective coax resources; and
generating the signals comprises mapping the respective data frames in the respective time slices to the respective coax resources.

21. The signal generation method of claim 20, wherein generating the signals further comprises selecting modulation and coding schemes for the respective data frames based on positions of the respective data frames in the respective time slices.

22. A non-transitory computer-readable storage medium storing one or more programs comprising instructions, which when executed by one or more processors in a communication device, cause the communication device to perform operations comprising:
allocating coax resources for signals to be transmitted over a cable plant;
generating a bitstream comprising data for the signals and information specifying the allocated coax resources, the bitstream further comprising data frames to convey the data for the signals and idle character sequences between the data frames, wherein times between successive data frames in the bitstream specify the allocated coax resources; and
providing the bitstream to a coax PHY in the communication device, wherein the coax PHY is to generate the signals based on the bitstream and to transmit the signals over the cable plant using the allocated coax resources; wherein:
a respective data frame in the bitstream is followed by a respective idle character sequence; and an amount of coax resources for the respective data frame is determined based on a ratio of a sum of durations of the respective data frame and the respective idle character sequence to a predefined symbol duration.

23. The non-transitory computer-readable storage medium of claim 22, wherein the bitstream comprises:
data frames to convey the data for the signals; and
control frames to convey the information specifying the allocated coax resources.

24. The non-transitory computer-readable storage medium of claim 23, wherein the control frames further specify modulation and coding schemes for the coax PHY to use to modulate and encode the data for the signals.

25. The non-transitory computer-readable storage medium of claim 23, wherein:
respective groups of the data frames correspond to respective OFDM symbols; and
respective control frames correspond to respective OFDM symbols and specify the allocated coax resources for the respective groups of the data frames.

26. The non-transitory computer-readable storage medium of claim 23, wherein:
the signals are downstream signals to be transmitted to a plurality of coax network units on the cable plant;
the control frames are downstream control frames; and
the bitstream further comprises upstream control frames to specify coax resources allocated for upstream transmissions from the plurality of coax network units.

27. The non-transitory computer-readable storage medium of claim 22, wherein:
the bitstream is divided into time slices;
respective time slices comprise respective data frames to convey the data for the signals; and
respective time slices correspond to respective coax resources.

28. A communication device, comprising:
means for allocating coax resources for signals to be transmitted over a cable plant;
means for generating a bitstream comprising data for the signals and information specifying the allocated coax resources, the bitstream further comprising data frames to convey the data for the signals and idle character sequences between the data frames, wherein times between successive data frames in the bitstream specify the allocated coax resources;
means for generating the signals based on the bitstream by mapping the data frames to coax resources based on the times between successive data frames in the bitstream; and
means for transmitting the signals over the cable plant using the allocated coax resources;
wherein:
a respective data frame in the bitstream is followed by a respective idle character sequence; and
an amount of coax resources for the respective data frame is determined based on a ratio of a sum of durations of the respective data frame and the respective idle character sequence to a predefined symbol duration.

* * * * *